US010454897B1

(12) United States Patent
Rajanna et al.

(10) Patent No.: US 10,454,897 B1
(45) Date of Patent: *Oct. 22, 2019

(54) PROXY CAPTIVE PORTAL TRAFFIC FOR INPUT-LIMITED DEVICES

(71) Applicant: Amazon Technologies, Inc., Seattle, WA (US)

(72) Inventors: Vijay Shankar Rajanna, Sunnyvale, CA (US); Kyle Haight, San Jose, CA (US); Ezekiel Wade Sanborn de Asis, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 124 days.

This patent is subject to a terminal disclaimer.

(21) Appl. No.: 15/003,575

(22) Filed: Jan. 21, 2016

(51) Int. Cl.
H04L 29/06 (2006.01)
H04L 29/08 (2006.01)

(52) U.S. Cl.
CPC .......... H04L 63/0281 (2013.01); H04L 63/08 (2013.01); H04L 63/10 (2013.01); H04L 67/02 (2013.01); H04L 67/104 (2013.01)

(58) Field of Classification Search
None
See application file for complete search history.

(56) References Cited

U.S. PATENT DOCUMENTS 9,332,054 B2   5/2016  Wilson et al.
9,398,007 B1   7/2016  Wegener et al.
9,609,067 B2 * 3/2017  Mobarak ............... H04L 67/141
9,853,943 B2 * 12/2017 Martini ............... H04L 63/0471
9,900,162 B2   2/2018  Woxland et al.
2013/0268666 A1 * 10/2013 Wilson ..................... H04L 63/08
                                                        709/225
2013/0286889 A1  10/2013 Cherian et al.
2014/0068030 A1 *  3/2014 Chambers ........... H04L 41/0809
                                                        709/220
2014/0153577 A1 *  6/2014 Janakiraman ......... H04L 47/122
                                                        370/392
2015/0012970 A1   1/2015 Toksvig et al.
2015/0071216 A1   3/2015 Iisar et al.
2015/0089592 A1 *  3/2015 Han ..................... H04W 12/06
                                                        726/4
2015/0142947 A1   5/2015 Dyba et al.
2015/0146706 A1   5/2015 Goluboff
2015/0201438 A1 *  7/2015 Adarapu ............... H04W 76/10
                                                        370/328

(Continued)

Primary Examiner — Trang T Doan
(74) Attorney, Agent, or Firm — Pierce Atwood LLP

(57) ABSTRACT

A system for registering an input-limited device, such as a voice-enabled device, with a captive access point that requires completion of a portal webpage prior to allowing client devices access to a network, such as the Internet, is described. Such captive access points are commonly found in hotels, and may be used for both freely provided public WiFi and for connections that require providing payment. For registration, the input-limited device operates as a proxy, relaying communications with the captive access point back-and-forth to a second device with rich user-input capabilities via an independent communications channel. Registration information is provided to the access point as though it originated with the input-limited device, allowing the input-limited device to acquire access to the network.

20 Claims, 7 Drawing Sheets

(56) References Cited

U.S. PATENT DOCUMENTS

| | | |
|---|---|---|
| 2015/0295885 A1* | 10/2015 | Congdon ............ H04L 61/2557 |
| | | 370/392 |
| 2016/0014660 A1* | 1/2016 | Bar ........................ H04W 4/80 |
| | | 455/439 |
| 2016/0066355 A1 | 3/2016 | Chakraborty et al. |
| 2016/0112262 A1 | 4/2016 | Johnson et al. |
| 2016/0156719 A1 | 6/2016 | Mobarak et al. |
| 2016/0226849 A1* | 8/2016 | Fan ....................... H04W 76/10 |
| 2016/0249213 A1* | 8/2016 | Wong .................. H04L 63/0876 |
| 2016/0344745 A1 | 11/2016 | Johnson et al. |
| 2017/0118210 A1 | 4/2017 | Athias |
| 2017/0171318 A1* | 6/2017 | Levithan ................. H04L 67/14 |
| 2017/0257619 A1 | 9/2017 | McCann et al. |

* cited by examiner

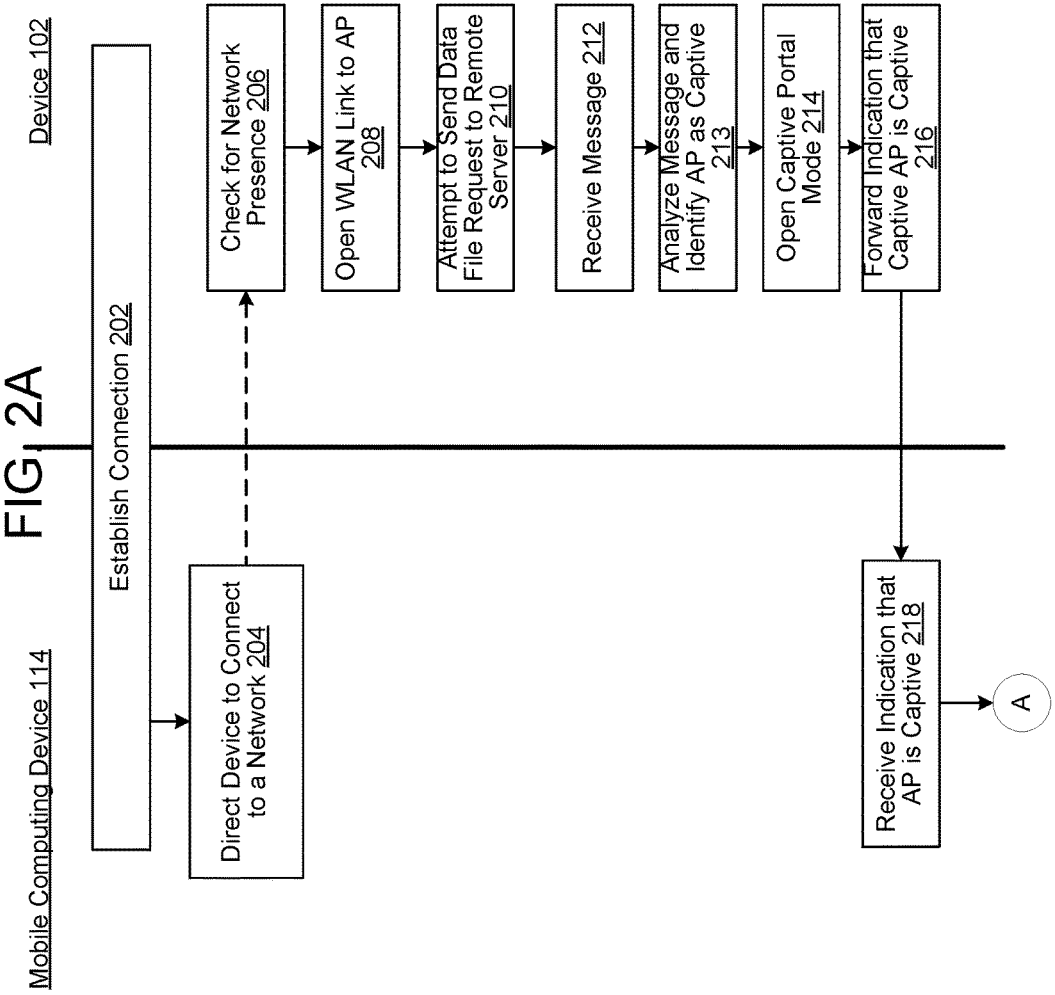

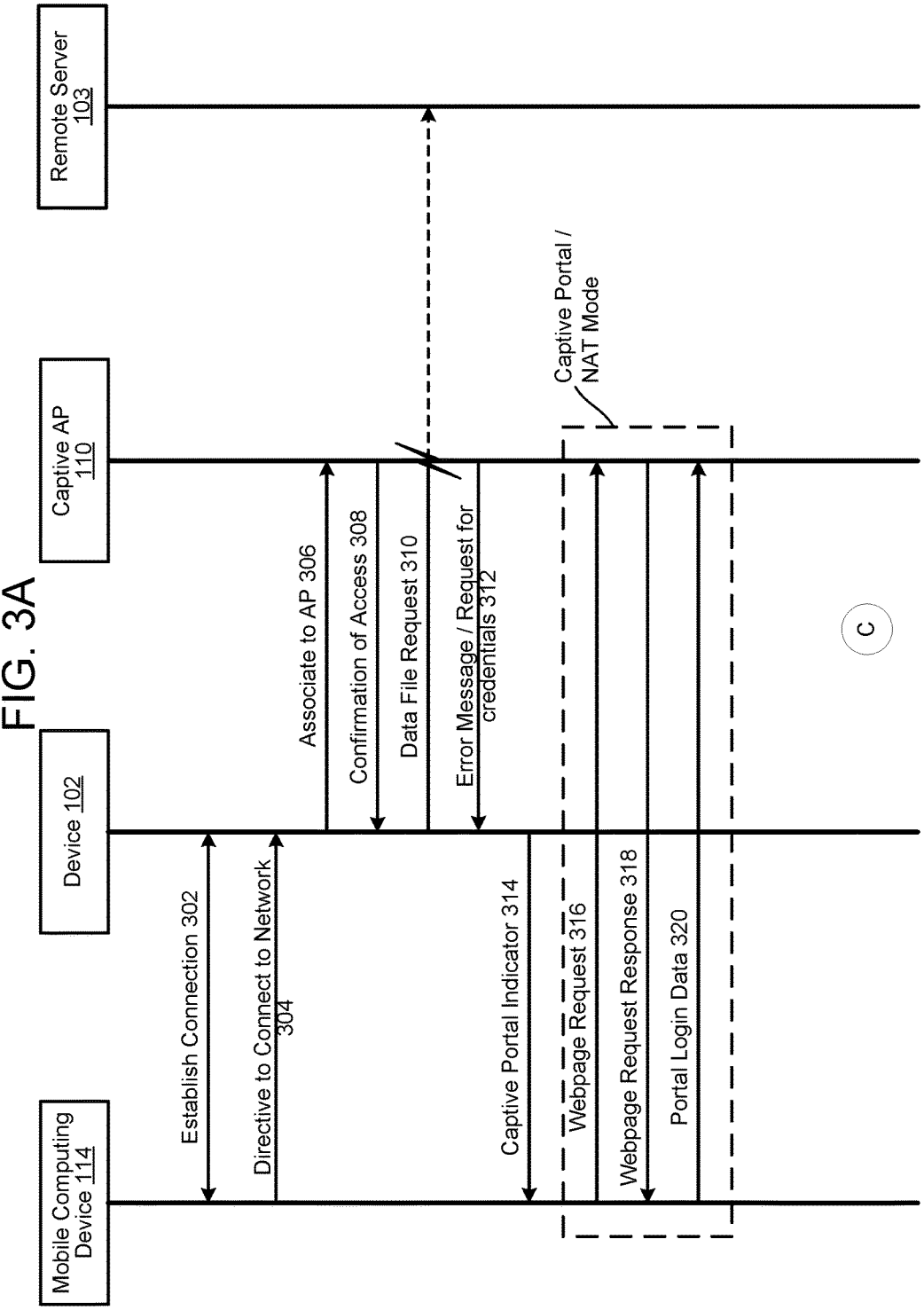

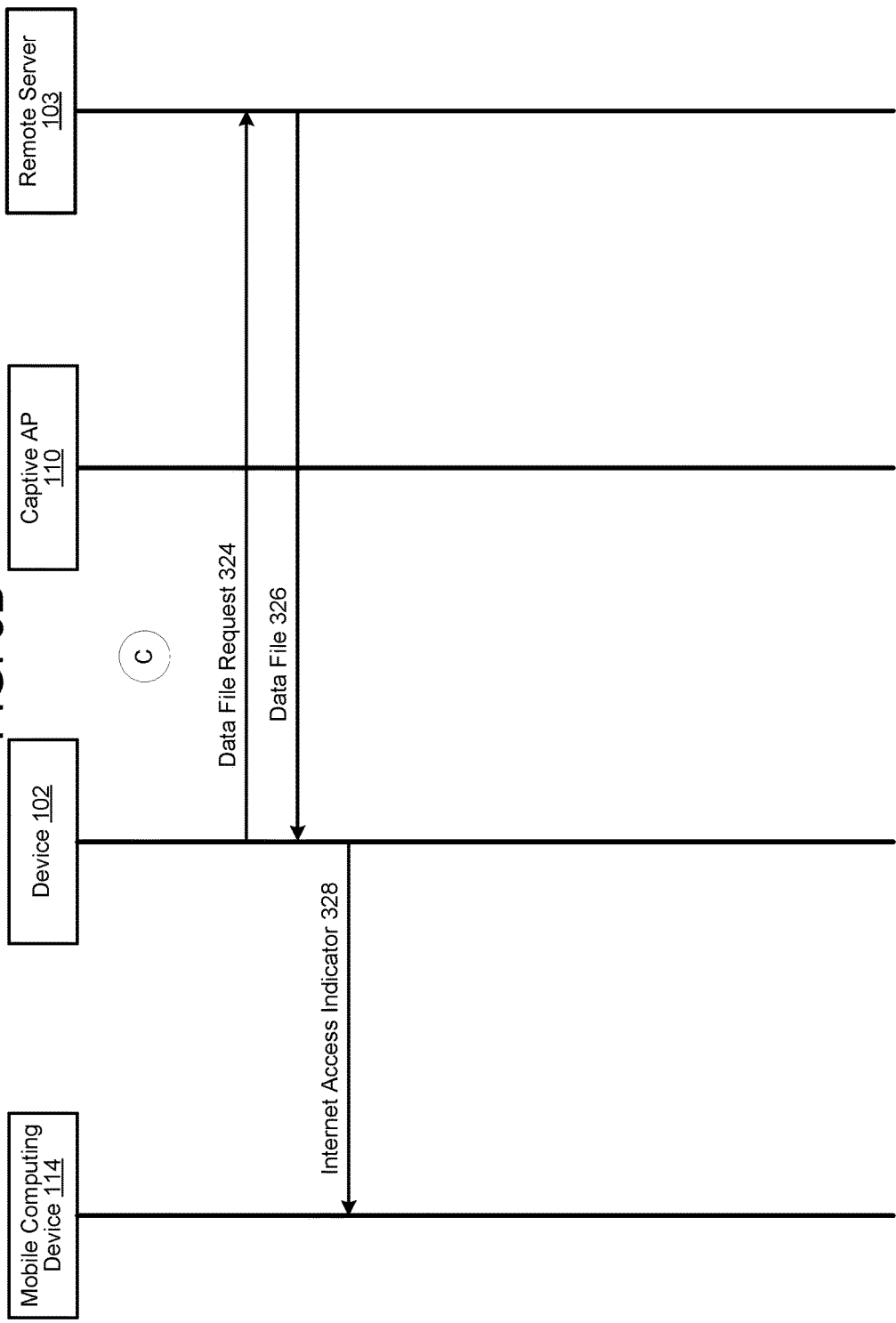

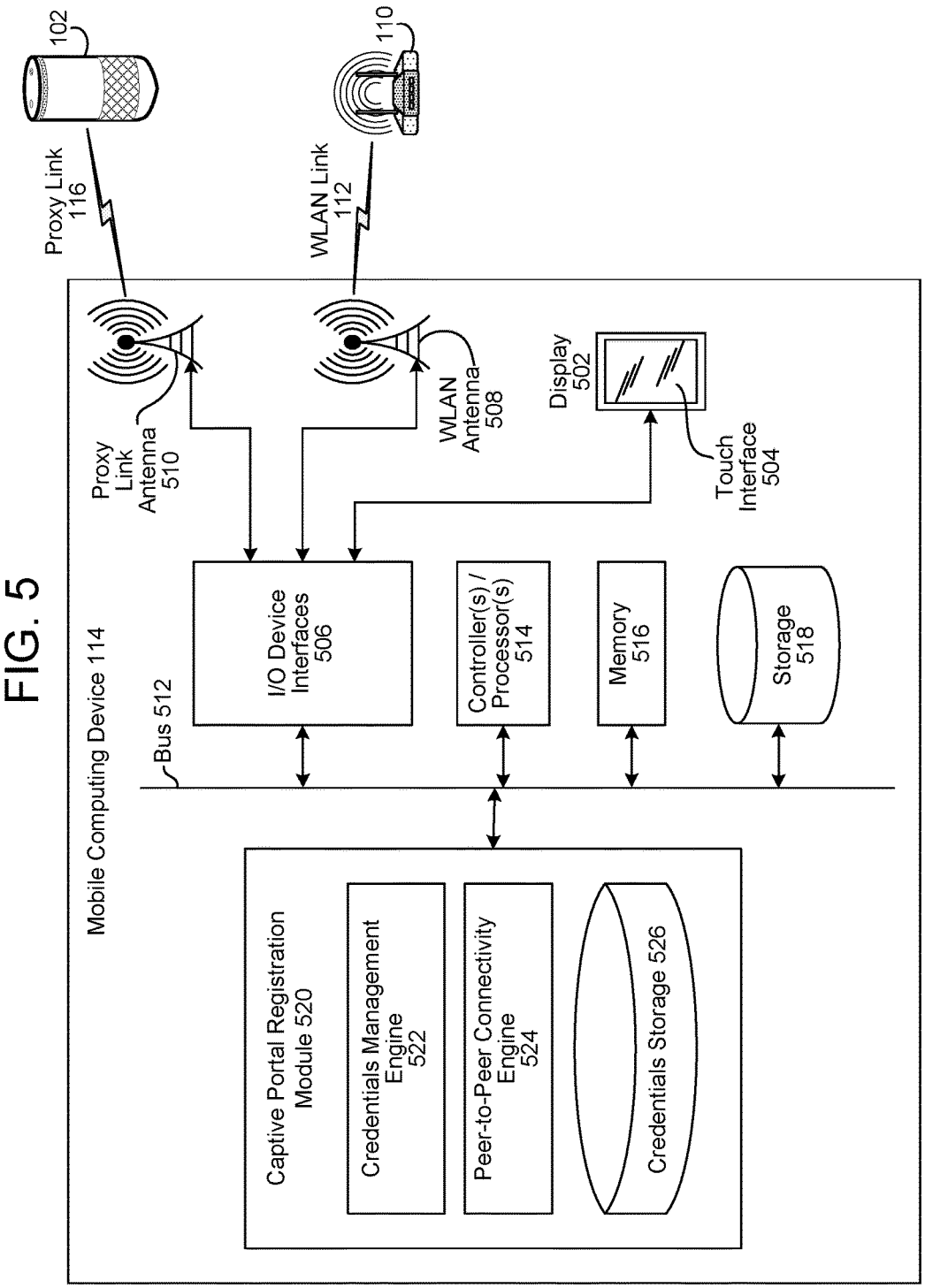

US 10,454,897 B1

PROXY CAPTIVE PORTAL TRAFFIC FOR INPUT-LIMITED DEVICES

BACKGROUND

Consumer electronics devices are capable of connecting to data servers over the Internet and retrieve data files on demand. Electronic devices come in a variety of forms, including "headless" devices which may not have certain input/output components such as a display, keyboard, touch-screen, etc.

BRIEF DESCRIPTION OF DRAWINGS

For a more complete understanding of the present disclosure, reference is now made to the following description taken in conjunction with the accompanying drawings.

FIGS. 2A and 2B illustrate an example of a process for sharing portal login credentials between the device and a mobile computing device.

FIGS. 3A and 3B are a signal flow diagram based on the processes in FIGS. 2A and 2B.

FIG. 5 is a block diagram conceptually illustrating example components of the mobile computing device.

DETAILED DESCRIPTION

Certain electronic devices may have limited user interface capabilities for entry of text information. For example, a voice-enabled device may lack an alphanumeric keyboard supporting single-keystroke direct user input of text characters for text entry. Text entry is sometimes needed, such as when a user of a headless or otherwise input/output limited device must enter login credentials (e.g., user name and password), accept terms of use, or otherwise provide information to join a (secure) wireless access point (e.g., a wireless local area network (WLAN) access point such as a WiFi access point).

Another scheme is to have the wireless computing device login to the secure access point and then upload the credentials to-be-shared to a server in the "cloud." Other devices then connect to the server to acquire the credentials using a secondary network, such as a cellular telephony data network.

However, these credential sharing schemes fail when the access point is a captive portal. Unlike secure access points that require credentials to connect, captive access points are typically "open," and allow a client device to connect without credentials. However, after connecting, the captive access point may force a connecting client device to display a special webpage that a user must complete to acquire network access privileges.

The webpage may be used for authentication purposes, and may require a new user to accept terms-of-service, provide login credentials, and/or provide a method of payment to gain network access. Until the user completes portal registration through the webpage, access to the network beyond the captive access point is limited or blocked. Captive portals are commonly deployed at hotels and used by public WiFi "hotspots."

Captive portal standards have not been widely accepted. Captive portal implementations tend to be ad hoc, providing inconsistent protocol-level support and limiting the ability of software and hardware developers to automate the registration process. Besides not being compatible with the credential sharing schemes used with secure access points, captive portals can be an insurmountable hurdle for screenless devices or other devices that lack web browsers. Without a web browser, the portal webpage provided by the captive access point cannot be displayed nor completed by a user of the device, even if credentials are acquired from another device. Further, because many devices rely on Internet access to perform speech recognition operations needed to operate the device, the device may effectively be inoperable (save for a few functions such as setup, etc.) until full Internet access is enabled. Unless the device is able to tether to a network through another device (e.g., connecting to the Internet by relaying data through a smart phone, which itself may have access to the Internet through the captive access point), a device that lacks a web browser will be unable to access remote data.

Figure 1:
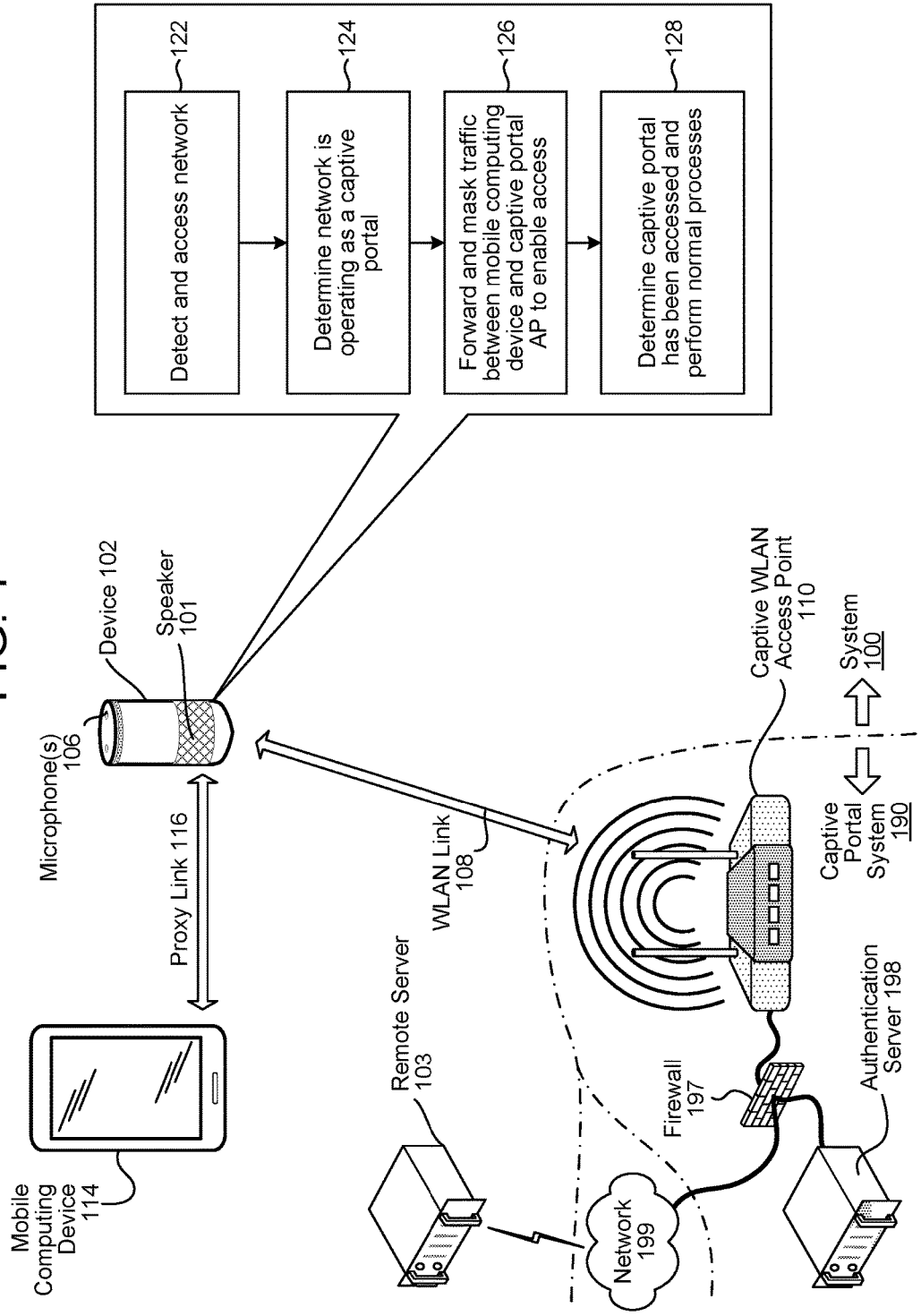
FIG. 1 illustrates a system for sharing login credentials with a device attempting to access a captive network access point.

Overcoming the obstacles posed by captive portals, FIG. 1 illustrates a system 100 where a device 102 forwards and masks data provided by a mobile computing device 114 so the device 102 can become registered to a captive portal system 190. A mobile computing device 114 is used to respond to a portal webpage and register the device 102 with the captive portal system 190, providing the device 102 access to an outside network 199 such as the Internet.

The device 102 may be an input/output-limited device. For example, the device 102 may lack a screen, keyboard, etc. In another example, the device 102 may include a display that has limited input (e.g., a device that uses a remote control). In a further example, the device 102 may be a device with a low resolution or small screen, incapable of displaying a webpage needed to gain Internet access through a captive portal.

When the device 102 acts as an intermediary between the mobile computing device 114 and a captive access point 110 of the captive portal system 190, the device 102 is serving as a proxy for purposes of registration to a captive portal system 190. In computer networking, a "proxy" functions as a bridge between two devices, passing on data and requests from one device to the other. When a proxy forwards data packets from one device to the other, it may substitute its own media access control (MAC) address (a unique device identifier discussed further below), and replaces any information about the origin of the packets in the packet headers to identify itself as being the packet's point-of-origin (in effect, shielding a device on one side of the proxy from seeing another device on the other side of the proxy). A "captive" access point is a wired or wireless network access point that requires login via a web browser prior to granting network access privileges. A "portal" is a webpage that is used to authenticate user credentials, get a user to accept terms, and/or to get user payment information, prior to granting a client device access to the network 199 (e.g., the Internet).

The device 102 is an example of an "input-limited" device. An input-limited device is a device which does not have rich user input capabilities (e.g., a device lacking a physical alphanumeric keyboard, and/or lacking a touch interface allowing direct interaction with a virtual alphanumeric keyboard, such that there is no provision for direct single-keystroke entry of alphanumeric text characters). While the teachings herein may apply to certain voice-enabled devices as an example of an input/output-limited device, the principles and examples described herein apply to any device, whether input/output-limited or not. Although the examples describe the captive access point 110 as being to a wireless network, the principles of operation also apply to wired networks, such as an Ethernet gateway, where a client device is presented with a portal webpage that must be completed in order to access a network through the captive gateway. In any event, whichever communication interface is originally used, that communication interface is used to perform subsequent operations. For example, if the original network accessed is a wireless network, the operations performed by the devices herein may be performed using only wireless communication interfaces. Alternatively, if the original network accessed is a wired network the operations performed by the devices may be performed using only wired communication interfaces.

Captive portals systems (illustrated as 190) may record the media access control (MAC) address of connecting devices. Devices registered through the portal are recognized by their MAC address, and are allowed to access the network 199 (e.g., the Internet) beyond the firewall 197. A MAC address is a unique identifier assigned to network interfaces of a device for communication purposes. MAC addresses are used as a network address/name for most IEEE 802 network technologies, including WiFi and Ethernet. MAC addresses are usually fixedly assigned by the manufacturer of a network interface controller (NIC) and are stored in its hardware. By having the device 102 serve as a proxy, interactions with the captive access point 110 during registration, even if they originate from the mobile computing device 114, appear to originate from the MAC address of the device 102, not the mobile computing device 114.

Devices with MAC addresses that are not associated with registered devices are directed by a firewall 197 to the portal, which may be provided by an authentication server 198. A typical captive portal setup is to have a firewall 197 intercept network packets from an unregistered client device until the device registers with the authentication server 198. Depending upon the network protocols supported, the authentication server 198 may cause an unregistered device to launch a web browser by pushing a portal webpage to the unregistered device, or the captured portal system may wait until the unregistered device attempts to access an address via the network 199 (e.g., attempts to access a uniform resource locator), at which point the firewall 197 redirects the web browser to the portal on the authentication server 198 for registration. Such techniques are sometimes referred to as Universal Access Method (UAM) in implementation and standards forums.

Although a captive portal system 190 comprising a captive access point 110, a firewall 197, and an authentication server 198 are illustrated in FIG. 1, the architecture of the captive portal system 190 is outside of the scope of the present disclosure, and is illustrated purely for explanatory purposes. In some implementations, the firewall 197 and the authentication server 198 are combined. In other implementations, the firewall 197 and the captive access point 110 are combined. In any case, the system 100 is intended to operate with any captive portal architecture where a portal webpage must be completed in order to unlock network access.

The mobile computing device 114 may connect the device 102 to the internet through the captive portal system 190 during a regular set-up process between the mobile computing device 114 and the device 102. For example, if, during a regular setup process the mobile computing device 114 and/or the device 102 determines that the accessed network is serviced by a captive portal, the device(s) may enter the captive portal access process discussed herein. For present purposes, the focus of the description will be on the captive portal access process, but it is understood that the methods and systems described below may also be used as part of other connection/setup procedures.

As illustrated in FIG. 1, the device 102 detects and accesses a network (e.g., through the captive portal access point (AP) 110) (illustrated as 122). As will be described further below, accessing of the captive AP 110 using the WLAN link 108 may be the result of a user selecting an access point within range from a list displayed on the mobile computing device 114, or may be in response to a directive from the mobile computing device 114 that directs the device 102 where to connect via the peer-to-peer proxy link 116.

According to the present disclosure, the device 102 may determine the network is operating as a captive portal (illustrated as 124).

Then, the device 102 forwards and masks traffic between the mobile computing device 114 and the captive portal AP 110 to enable registration of the device 102 with the captive network, thus enabling access to the network 199 through the AP 110 (illustrated as 126). Forwarding of data by the device 102 enables the mobile computing device 114 to communication with the captive portal system 190. Masking data makes the captive portal system 190 think it is communicating with the device 102, not the mobile computing device 114. When forwarding to the captive access point 110, data/information appears to originate from the MAC/IP address of the device 102 rather than the mobile computing device 114. To mask the data the device 102 may remove any packet header information identifying the mobile computing device 114 as the origin of the registration information, and may also add packet header information identifying itself (i.e., device 102) as the origin. Data may be masked by changing the MAC and/or IP address of the data from the MAC/IP address of the mobile computing device 114 to the MAC/IP address of the device 102. Once the device 102 determines that network access is complete, the device may exit its captive portal mode and perform normal processes (illustrated as 128).

Figure 2B:
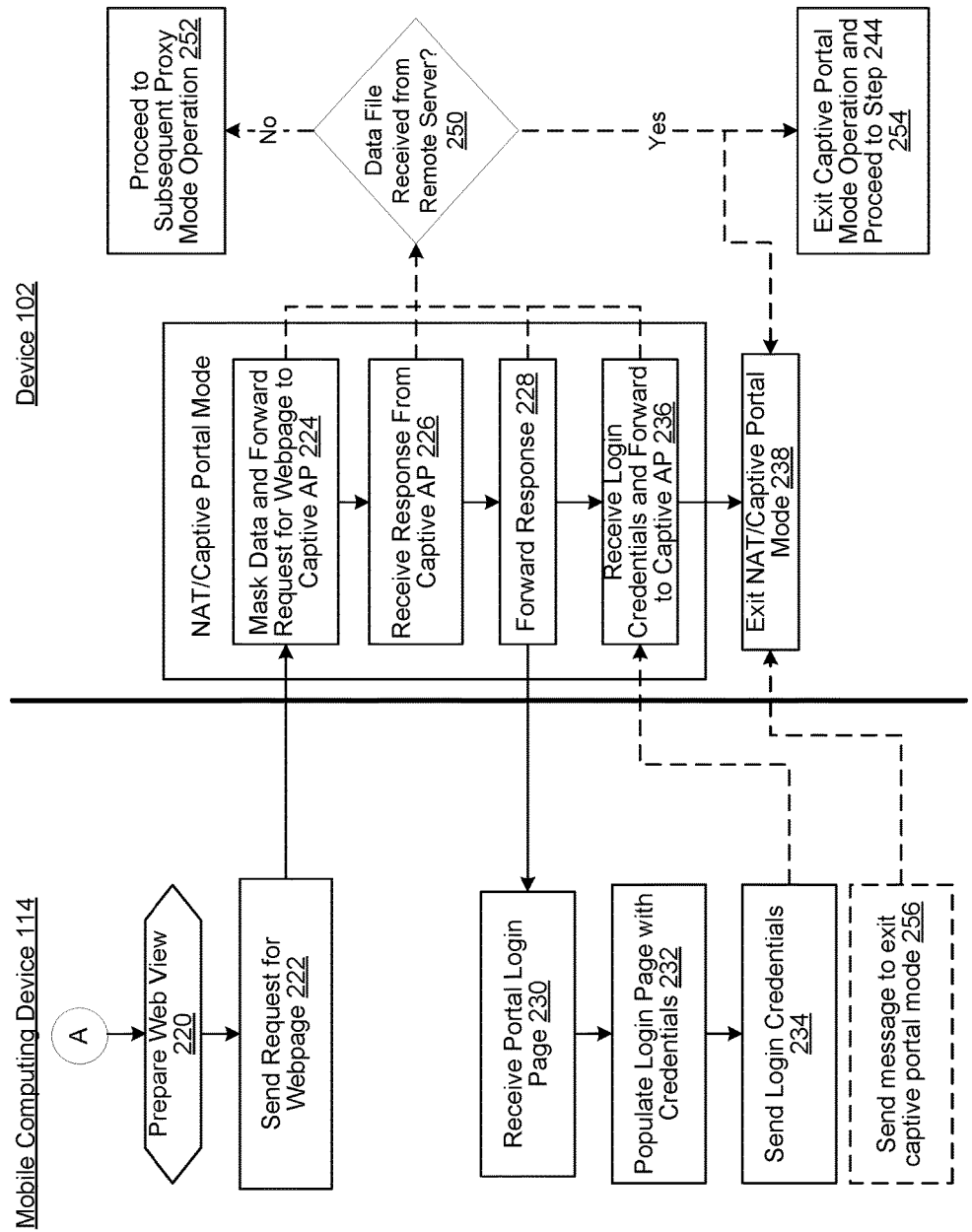

FIGS. 2A and 2B illustrate an example of a process directed by the mobile computing device 114 for sharing credentials with the device 102. Referring to FIG. 2A, either the mobile computing device 114 or the device 102 establishes a connection/pairs with the reciprocal device (illustrated as 202). This connection may be part of a typical set-up process. For example, a user of the mobile computing device 114 may access an application on the mobile computing device 114 using a service set identifier (SSID), and the application may use credentials to connect to the device 102. The credentials may include information about the mobile computing device 114, information about the device 102, or a combination thereof. Once the mobile computing device 114 and the device 102 are connected, the mobile computing device 114 directs the device to connect to a network (illustrated as 204). For example, the mobile computing device may gain access to a network and, subsequently, the mobile computing device may indicate to the device 102 a wireless network identifier associated with a service set identifier (SSID) of the network that the mobile computing device is authorized to access. Alternatively, the device 102 may attempt to connect to a network on its own.

In response, the device checks for the presence of a network (illustrated as 206). The network being searched for may be a wireless network or wired network. (Indeed, the captive portal access procedures described herein may be used with wireless or wired network access.) When the captive AP 110 is identified, the device 102 opens a link with the AP 110 (illustrated as 208). The device 102 then attempts to send a data file request to the remote server 103 (illustrated as 210). Since the captive AP 110 is captive, the device 102 receives a message (or some other data not expected) in response to sending the data file request (illustrated as 212). For example, the received message may be an error message or a redirect message. Additionally, the received message can explicitly indicate the accessed AP as being captive. Then, the device 102 interprets/analyzes the received message and therefrom determines the accessed AP is captive (illustrated as 213). Thereafter, the device 102 enters a captive portal mode (illustrated as 214). The captive portal operation mode of the device 102 masks data received by the device 102 so the data appears as if it originated at the device 102. For example, the device 102 may implement Network Address Translation (NAT) protocols that transforms the original Internet Protocol (IP) address of the data into the device's IP address by modifying network address information in IP packet headers of the data. The device 102 (after entering its captive portal mode) then forwards an indication detailing that the captive AP 110 is captive to the mobile computing device 114 (illustrated as 216).

The mobile computing device 114 receives the indication (illustrated as 218) and prepares a web view (i.e., opens a web connection) (illustrated as 220 in FIG. 2B). The web view could be prepared in a web browser or within a non-web browser application of the mobile computing device 102. The mobile computing device 114 then sends a request (e.g., a HTTP GET request) for a webpage to the device 102 (illustrated as 222), which masks the request (so it appears it originated from the device 102) and forwards the request to the captive AP 110 (illustrated as 224). Masking/replacing the header data may not modify content of the HTTP data payload. For example, the source IP address in the IP header may be modified, and the IP check sum as a response. Moreover, the layer II encapsulation header may be modified to include data specific to the device 102. But the data payload being exchanged (which includes the authentication/credential data to access the captive portal) is not altered.

In an example, instead of merely altering the header data of the received webpage request, the device 102 generates a new, second webpage request that includes identifying information of the device 102, not the mobile computing device 114. In this example, the newly generated, second webpage request is sent to the captive AP 110, not the webpage request generated by the mobile computing device 114.

The device 102 then receives a response from the captive AP 110 (illustrated as 226). The response may include the portal login page or an HTTP REDIRECT response. For example, the HTTP redirect may be an error message that includes a request for credentials to be used to gain Internet access through the captive AP 110. The device 102 then forwards the response to the mobile computing device 114 (illustrated as 228). In an example, the device 102 may unmask the received response (i.e., review the content of the received response/data packets) to determine the response should be forwarded to the mobile computing device 114.

After receiving the data packets comprising the portal login page from the device 102 (illustrated as 230), the webpage is instantiated by the web browser or other application of the mobile computing device 114, is populated with login credentials by the mobile computing device 114 (illustrated as 232), for example by a user inputting the credentials into the mobile computing device 114. As noted above, fields may be completed, button and/or check buttons may be set, etc. A user may also interact with the webpage via a direct input user interface of the mobile computing device 114 (e.g., touch screen, single-keystroke direct user entry keyboard, etc.), and cause the registration to be submitted upon completion (e.g., click or touch an "enter" button on the portal login page). Then the mobile computing device 114 sends the login credentials to the device 102 (illustrated as 234).

The device 102 receives the login credentials, masks the login data to make it appear as if it originated from the device 102, and sends the login credentials to the captive AP 110 (illustrated as 236). For example, the device 102 may alter the headers/source IP/MAC information, but not the payload data, so the data appears like its coming from the device 102. Thereafter, the AP may confirm access and the device 102 stops/exits NAT/captive portal mode (illustrated as 238). Once this occurs, the device 102 no longer masks data.

The device 102 may repeatedly (e.g., after each step performed by the device 102 while in captive portal mode) attempt to retrieve a data file from the remote server 103. After each attempt, the device 102 determines whether it received a data file from the remote server 103 (illustrated as 250). If the device 102 did not receive a file, the device 102 performs the subsequent captive portal mode operation (illustrated as 252). For example, if step 250 is performed after step 224, and it is determined no file was received, the device 102 would then perform step 226. Alternatively, if it is determined that the device 102 received a file from the remote server 103, the device 102 exits it captive portal mode operation protocol (illustrated as 254). Alternatively, the mobile device 114 may send a message to the device 102 that causes the device 102 to exit captive portal mode (illustrated as 256).

FIGS. 3A and 3B are a signal flow diagram based on the processes in FIGS. 2A and 2B. Incidental signals such as acknowledgements and communication link set-up protocol messages are omitted for brevity.

Either the mobile computing device 114 of the device 102 requests establishment of a connection between the devices (illustrated as 302). After the link is established, the mobile computing device 114 sends a directive to the device 102 to connect to a network (illustrated as 304). The device 102 then checks for a network and, after identifying the presence of the AP 110, associates with the AP 110 (illustrated as 306). Thereafter, the captive AP 110 sends an access confirmation to the device 102 (illustrated as 308). The device 102 then attempts to send a data file request to the remote server (illustrated as 310), but the request is stopped by the captive AP 110. The captive AP 110 then sends a message (e.g., an error message) to the device 102 in response (illustrated as 312). This error message may also include a request for credentials to be used to gain Internet access through the captive AP 110. The error message indicates to the device 102 that it has network access, but not Internet access. The device 102 thereafter identifies the captive AP 110 as captive and institutes its masking/captive portal protocols (not illustrated). Once entering a captive portal mode, the device 102 sends an indication, detailing that the captive AP 110 is captive, to the mobile computing device 114 (illustrated as 314).

In response to receiving the indicator, the mobile computing device 114 prepares a web view (not illustrated). Then, the mobile computing device 114 sends a request (e.g., a HTTP GET request) for a webpage to the device 102, which masks and forwards the request to the captive AP 110 (illustrated as 316). When the device 102 receives the request data, the request data has information identifying the mobile computing device 114 as the source of the request. Since the device 102 is in a captive portal mode when it receives the request, the device 102 changes the source identifying information of the request from the mobile computing device 114 to the device 102. By doing this, the device 102 masks the data so it appears as if the data originated from the device 102 when it is received by the captive AP 110. After receiving the webpage request, the captive AP 110 sends a response (e.g., data corresponding to a portal login/registration page) to the device 102, which unmasks the data (to determine it needs to be sent to the mobile computing device 114) and forwards it to the mobile computing device 114 (illustrated as 318). As described above, the device 102 masks data forwarded from the mobile computing device 114 to the captive AP 110. When forwarding data in the reverse direction (i.e., from the captive AP 110 to the mobile computing device 114), the device 102 may or may not be configured to mask data.

After it receives the portal login page, the mobile computing device, or a user thereof, populates the login page with credentials and transmits the login information to the captive AP 110, through the device 102 (illustrated as 320).

When the device 102 receives the indication that the mobile computing device's web browser is closed, the device 102 exits its captive portal mode (i.e., ceases implementing its captive portal protocols) (not illustrated) and sends a data file request to the remote server 103 (illustrated as 324 in FIG. 3B). If the mobile computing device 114 submitted proper login/registration information to the captive AP 110, the remote server 103 is properly accessed (i.e., the device 102 has Internet access) and the remote server 103 sends the device 102 a data file (illustrated as 326). If the device 102 verifies the received file is the same file that was requested, (for example, by comparing the received data file is the same as a reference data file stored in the memory of the device 102), the device 102 sends an indication to the mobile computing device 114 representing that the device 102 is connected to the Internet (illustrated as 328). The Internet access indicator may be sent in response to an initial communication from the mobile computing device 114.

Figure 4:
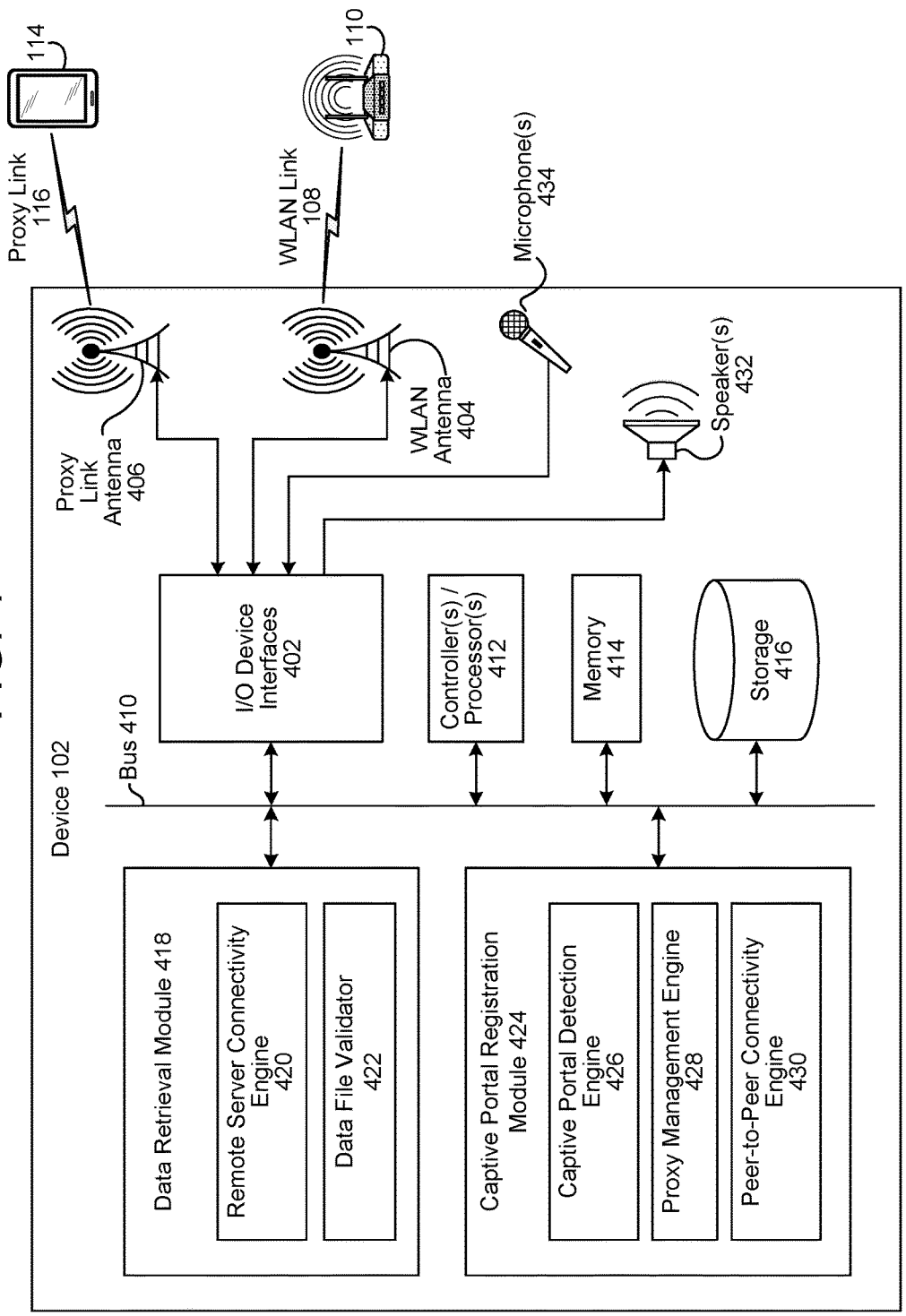
FIG. 4 is a block diagram conceptually illustrating example components of the device.

FIG. 4 is a block diagram conceptually illustrating example components of the device 102. As noted above, although the device 102 is illustrated as being voice-enabled, the device 102 may be any input-limited device that does not have rich user input capabilities. In operation, the device 102 may include computer-readable and computer-executable instructions that reside on the device 102, as will be discussed further below.

As illustrated in FIG. 4, the device 102 is an input-limited device, such as a device that lacks conventional rich user input capabilities, such as a keyboard and/or a touch screen able to accept direct single-keystroke entry of text. The device 102 includes input/output (I/O) device interfaces 402, which provide the device 102 with connectivity and protocol support. A variety of input and output connections may be made through the input/output device interfaces 402. For example, a WLAN antenna 404 may be used to provide connectivity to the captive access point 110. The same WLAN antenna 404 or another antenna 406 may be used for the proxy link 116 to the mobile computing device 114.

A variety of protocols may be supported by the I/O device interfaces 402 for the proxy link 116. For example, the proxy link 116 may be Bluetooth, WiFi Direct, or Near Field Communication (NFC). In the alternative, instead of using a radio frequency (RF) interface for the peer-to-peer link, the link may be based on another technology, such as ultrasonic communication or infrared communication. Also, either in addition to or as an alternative to the WLAN antenna 404 servicing the WLAN link 108 to the access point 110, the I/O device interfaces 402 may support a wired connection such as Ethernet by which to connect to the captive portal system 190 and the network 199.

The input/output device interfaces 402 may also support other types of connections and communications protocols. For example, the device 102 may also include an interface for an external peripheral device connection such as universal serial bus (USB), FireWire, Thunderbolt, or other wired connection protocol.

The I/O device interfaces 402 may also support other wireless connection protocols in addition to WLAN (e.g., WiFi), Bluetooth, WiFi Direct and/or NFC. For example, the peer-to-peer proxy link 116 may communicate with the device 102 using IrDA, wireless USB (universal serial bus), Z-Wave (a home automation radio technology), and/or ZigBee (i.e., the IEEE 802.15.4 standards). Instead of or in addition to WLAN and/or Ethernet, the peer-to-peer proxy link 116 may be replaced with some other type of network communication support, such as cellular data communications related to a Long Term Evolution (LTE) network, WiMAX network, CDMA network, GSM network, etc. For example, the captive portal system 190 may support LTE connectivity, where a client device (e.g., the device 102 or mobile computing device 114) associated with an unregistered subscriber identification module (SIM) is provided the opportunity to register via a portal webpage transmitted to the client device after it opens the communication link or attempts to access the network.

The device 102 may include an address/data bus 410 for conveying data among components of the device 102. Each component within the device 102 may also be directly connected to other components in addition to (or instead of) being connected to other components across the bus 410.

The device 102 may include one or more controllers/processors 412, that may each include a central processing unit (CPU) for processing data and computer-readable instructions, and a memory 414 for storing data and instructions. The memory 414 may include volatile random access memory (RAM), non-volatile read only memory (ROM), non-volatile magnetoresistive (MRAM) and/or other types of memory. The device 102 may also include a data storage component 416, for storing data and controller/processor-executable instructions (e.g., instructions to perform the processes performed by the device 102 in FIGS. 2A and 2B, and 3A and 3B). The data storage component 416 may include one or more non-volatile storage types such as magnetic storage, optical storage, solid-state storage, etc. The device 102 may also be connected to removable or external non-volatile memory and/or storage (such as a removable memory card, memory key drive, etc.) through the input/output device interfaces 402.

Computer instructions for operating the device 102 and its various components may be executed by the controller(s)/processor(s) 412, using the memory 414 as temporary "working" storage at runtime. The computer instructions may be stored in a non-transitory manner in non-volatile memory 414, storage 416, or an external device. Alternatively, some or all of the executable instructions may be embedded in hardware or firmware in addition to or instead of software.

The device 102 further includes a data retrieval module 418. The data retrieval module 418 includes a remote server connectivity engine 420 and a data file validator 422. The data retrieval module 418 operates in a conventional fashion, with the exception that the remote server connectivity engine 420 may share connectivity transaction data (e.g., receipt of portal data pushed to the device 102 from the captive access point 110, inability to connect to the remote server 103 after establishing WLAN link 108, etc.) with a captive portal registration module 424. The data file validator 422 may be used, for example, in step 250 to confirm if the data file has been received from the remote server (thus indicating that the voice controlled device 102 has access to the Internet).

The captive portal registration module 424 includes a captive portal detection engine 426 that determines that the access point 110 is captive. For example, the captive portal detection engine 426 may, after the remote server connectivity engine 420 attempts to transmit a data file request over the network 199, determine that the error message received in response is not the elicited data file. A proxy management engine 428 of the captive portal registration module 424 performs processes connected with captive portal proxy (CPP) mode operations. A peer-to-peer connectivity engine 430 of the captive portal registration module 424 performs processes to establish the peer-to-peer proxy link 116. The proxy management engine 428 determines that proxy operations are warranted based on a determination by the captive portal detection engine 426 that the access point 110 is captive. The proxy management engine 428 is responsible for CPP mode establishment and operations, in coordination with the peer-to-peer connectivity engine 430, which manages the peer-to-peer proxy link 116 (e.g., establishment and tear-down).

The input/output device interfaces 402 may connect to an audio output component such as a speaker 432, a wired headset or a wireless headset (not illustrated) or an audio capture component. The audio capture component may be, for example, a microphone 434 or array of microphones (not illustrated, a wired headset or a wireless headset (not illustrated), etc. The microphone 434 may be configured to capture audio, including speech including an utterance. The device 102 (using the microphone 434, an audio processing component (not illustrated), etc.) may be configured to determine audio data corresponding to the captured audio (e.g., audio data directing the device 102 to retrieve a data file). The device 102 (using the input/output device interfaces 402, antennae 404, 406, etc.) may also be configured to transmit the audio data to a server for further processing.

While the illustrations herein discuss a captive portal situation, where login is accomplished using a webpage, the method and system herein may be used with other login situations. For example, the present system may be used when a first device is used to connect a second device to a network, and the login credentials are supplied by a first device, but altered to appear as if coming from the second device, and sent to a network access device so that the second device may be connected to the network.

FIG. 5 is a block diagram conceptually illustrating example components of the mobile computing device 114. As noted above, the mobile computing device 114 is a device with a full-featured user interface that supports a web browser, such as a notebook computer, a tablet computer, or a smart phone. In operation, the mobile computing device 114 may include computer-readable and computer-executable instructions that reside on the mobile computing device 114, as will be discussed further below.

As illustrated in FIG. 5, the mobile computing device 114 is a full-featured user interface device that provides at least one user interface for direct single-keystroke entry of alphanumeric text, such as a device that includes a display 502 with a touch interface 504 for display of the portal webpage and a virtual alphanumeric keyboard, or a device with the display 502 with a physical alphanumeric keyboard (not illustrated).

The mobile computing device 114 includes input/output (I/O) device interfaces 506, which provide the mobile computing device 114 with connectivity and protocol support. A variety of input and output connections may be made through the input/output device interfaces 506. For example, a WLAN antenna 508 may be used to provide connectivity to the captive portal access point 110. The same WLAN antenna 508 or another antenna 510 may be used for the proxy link 116 to the device 102.

As described in connection to the device 102, a variety of protocols may be supported by the I/O device interfaces 506 for the proxy link 116. For example, the proxy link 116 may be Bluetooth, WiFi Direct, or NFC. In the alternative, instead of using a radio frequency (RF) interface for the peer-to-peer link, the link may be based on another technology, such as ultrasonic communication or infrared communication. Also, either in addition to or as an alternative to the WLAN antenna 508 servicing the WLAN link 112 to the captive access point 110, the I/O device interfaces 506 may support a wired connection such as Ethernet by which to connect to the captive portal system 190 and the network 199.

The input/output device interfaces 506 may also support other types of connections and communications protocols. For example, the mobile computing device 114 may also include an interface for an external peripheral device connection such as universal serial bus (USB), FireWire, Thunderbolt or other wired connection protocol.

The I/O device interfaces 506 may also support other wireless connection protocols in addition to WLAN (e.g., WiFi), Bluetooth, WiFi Direct, and/or NFC. For example, the peer-to-peer proxy link 116 may communicate with the device 102 using IrDA, wireless USB (universal serial bus), Z-Wave (a home automation radio technology), and/or ZigBee (i.e., the IEEE 802.15.4 standards). Instead of or in addition to WLAN and/or Ethernet, either the peer-to-peer proxy link 116 or the WLAN link 112 may be replaced with some other type of network communication support, such as cellular data communications related to a Long Term Evolution (LTE) network, WiMAX network, CDMA network, GSM network, etc. For example, the captive portal system 190 may support LTE connectivity, where a client device (e.g., the device 102 or mobile computing device 114) associated with an unregistered subscriber identification module (SIM) is provided the opportunity to register via a portal webpage transmitted to the client device after it opens the communication link or attempts to access the network.

The mobile computing device 114 may include an address/data bus 512 for conveying data among components of the mobile computing device 114. Each component within the mobile computing device 114 may also be directly connected to other components in addition to (or instead of) being connected to other components across the bus 512.

The mobile computing device 114 may include one or more controllers/processors 514, that may each include a central processing unit (CPU) for processing data and computer-readable instructions, and a memory 516 for storing data and instructions. The memory 516 may include volatile random access memory (RAM), non-volatile read only memory (ROM), non-volatile magnetoresistive (MRAM) and/or other types of memory. The mobile computing device 114 may also include a data storage component 518, for storing data and controller/processor-executable instructions (e.g., instructions to perform the processes performed by the device 102 in FIGS. 2A and 2B, and 3A and 3B). The data storage component 518 may include one or more non-volatile storage types such as magnetic storage, optical storage, solid-state storage, etc. The mobile computing device 114 may also be connected to removable or external non-volatile memory and/or storage (such as a removable memory card, memory key drive, etc.) through the input/output device interfaces 506.

Computer instructions for operating the mobile computing device 114 and its various components may be executed by the controller(s)/processor(s) 514, using the memory 516 as temporary "working" storage at runtime. The computer instructions may be stored in a non-transitory manner in non-volatile memory 516, storage 518, or an external device. Alternatively, some or all of the executable instructions may be embedded in hardware or firmware in addition to or instead of software.

The mobile computing device 114 further includes a captive portal registration module 520. A credentials management engine 522 of the captive portal registration module 520 performs processes connected with captive portal proxy (CPP) mode operations. A peer-to-peer connectivity engine 524 of the captive portal registration module 520 performs processes to establish the peer-to-peer proxy link 116. The credentials management engine 522 accepts proxy operation requests from the device 102, stores credentials and user selections when populating/completing a portal webpage, and populates portal webpages using stored credentials and user selections.

Credentials storage 526 stores login credentials and user choices when the portal webpage is completed, so that the stored information may be used later to either register a client proxy device (e.g., the device 102). The credentials storage 526 may be part of memory 516, storage 518, or a separate storage element.

The concepts disclosed herein may be applied within a number of different devices and computer systems, including for example, input-limited computer systems such multimedia set-top boxes, wearable computing devices (watches, glasses, etc.), etc., and full-featured computing devices, including for example, laptop computers, cellular "smart" telephones, personal digital assistants (PDAs), tablet computers, wearable computing devices (e.g., watches, glasses), etc.

The disclosed examples were chosen to explain the principles and application of the disclosure and are not intended to be exhaustive or to limit the disclosure. Many modifications and variations of the disclosed aspects may be apparent to those of skill in the art. Persons having ordinary skill in the field of device credentials sharing should recognize that components and process steps described herein may be interchangeable with other components or steps, or combinations of components or steps, while still achieving the benefits and advantages of the present disclosure. Moreover, it should be apparent to one skilled in the art, that the disclosure may be practiced without some or all of the specific details and steps disclosed herein.

The processes and device operations related to credentials sharing and CPP-mode operations may be performed as operating system level operations and/or by software applications executed by the device 102 and the mobile computing device 114. As such, aspects of the disclosed system 100 may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. In addition, one or more engines of the data retrieval module 418, the captive portal registration module 424, and the captive portal registration module 520 may be implemented as firmware or as a state machine in hardware. For example, at least the data file validator 422 of the data retrieval module 418 may be implemented as an application specific integrated circuit (ASIC), a digital signal processor (DSP), or some combination thereof. As another example, the proxy management engine 428 and/or the credentials management engine 522 may be implemented as a state machine using a field programmable gate array (FPGA).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method performed by a first computing device, comprising:
   receiving, from a captive access point associated with a captive portal, first data representing a portal login webpage;
   sending the first data to a second computing device;
   receiving, from the second computing device and after sending the first data, second data representing the portal login webpage populated with captive portal login credentials, the second data including second computing device identifying information;
   generating third data representing the portal login webpage populated with the captive portal login credentials, the third data being generated from the second data by replacing the second computing device identifying information with first computing device identifying information;
   sending the third data to the captive access point, the third data causing the first computing device to be registered with the captive portal based at least in part on the third data including the captive portal login credentials and the first computing device identifying information;
   after sending the third data to the captive access point, sending a data request to a remote server via the captive access point; and
   receiving, after sending the data request, fourth data from the remote server via the captive access point.

2. The computer-implemented method of claim 1, wherein the first computing device identifying information includes network address information in Internet Protocol packet headers of the third data.

3. A first computing device, comprising:
   at least one processor; and
   at least one memory including instructions that, when executed by the at least one processor, cause the first computing device to:
   receive, from a second computing device, first data representing webpage content populated with captive portal login credentials, the first data including second computing device identifying information associated;
   generate second data representing the webpage content populated with the captive portal login credentials, the second data including first computing device identifying information instead of the second computing device identifying information;

send the second data to an access point associated with a captive portal, the second data causing the first computing device to be registered with the captive portal based at least in part on the second data including the captive portal login credentials and the first computing device identifying information;

after sending the second data, send a request for data to a remote device via the access point; and receive, via the access point after sending the request for data, third data from the remote device.

4. The first computing device of claim 3, wherein the at least one memory further includes instructions that, when executed by the at least one processor, further cause the first computing device to:

send, to the access point prior to receiving the first data, a second request for data intended for the remote device;

receive, after sending the second request for data, an error message from the access point; and receive the first data after receiving the error message.

5. The first computing device of claim 3, wherein the at least one memory further includes instructions that, when executed by the at least one processor, further cause the first computing device to:

receive an indication that a web browser of the second computing device has been closed; and exit a captive portal mode.

6. The first computing device of claim 3, wherein the at least one memory further includes instructions that, when executed by the at least one processor, further cause the first computing device to:

determine the third data is receivable from the remote device after at least one of:
 the second data is sent to the access point,
 the third data is received from the access point, or
 the third data is forwarded to the second computing device.

7. The first computing device of claim 3, wherein:
the second data includes a hypertext transfer protocol (HTTP) GET request; and
the third data is a product of a HTTP redirect by the access point.

8. The first computing device of claim 3, wherein the at least one memory further includes instructions that, when executed by the at least one processor, further cause the first computing device to:

receive, from the second computing device, an instruction directing the first computing device to send the request for data.

9. The first computing device of claim 3, wherein the at least one memory further includes instructions that, when executed by the at least one processor, further cause the first computing device to:

generate the second data by:
 deleting first network address information in a first Internet Protocol packet header corresponding to the first data, the first network address information being associated with the second computing device;
 generating second network address information associated with the first computing device; and
 including the second network address information in a second Internet Protocol packet header of the second data.

10. The first computing device of claim 3, wherein the at least one memory further includes instructions that, when executed by the at least one processor, further cause the first computing device to:

receive, from the second computing device, an indication that a web browser of the second computing device has been closed; and receive the third data after receiving the indication.

11. The first computing device of claim 3, wherein the first computing device communicates with the second computing device using a peer-to-peer communication channel selected from the group consisting of WiFi Direct, Bluetooth, Near Field Communication, IrDA, wireless Universal Serial Bus, Z-Wave, and ZigBee.

12. A method performed by a first computing device, comprising:

receiving, from a second computing device, first data representing webpage content populated with captive portal login credentials, the first data including second computing device identifying information;

generating second data representing the webpage content populated with the captive portal login credentials, the second data including first computing device identifying information instead of the second computing device identifying information;

sending the second data to an access point associated with a captive portal, the second data causing the first computing device to be registered with the captive portal based at least in part on the second data including the captive portal login credentials and the first computing device identifying information;

after sending the second data, sending a request for data to a remote device via the access point; and receiving, via the access point after sending the request for data, third data from the remote device.

13. The method of claim 12, further comprising:
sending, to the access point prior to receiving the first data, a second request for data intended for the remote device;
receiving, after sending the second request for data, an error message from the access point; and
receiving the first data after receiving the error message.

14. The method of claim 12, further comprising:
receiving an indication that a web browser of the second computing device has been closed; and
exiting a captive portal mode.

15. The method of claim 12, further comprising:
determining the third data is receivable from the remote device after at least one of:
 the second data is sent to the access point,
 the third data is received from the access point, or
 the third data is forwarded to the second computing device.

16. The method of claim 12, wherein:
the second data includes a hypertext transfer protocol (HTTP) GET request; and
the third data is a product of a HTTP redirect by the access point.

17. The method of claim 12, further comprising:
receiving, from the second computing device, an instruction directing the first computing device to send the request for data.

18. The method of claim 12, wherein generating the second data further comprises:
deleting first network address information in a first Internet Protocol packet header corresponding to the first data, the first network address information being associated with the second computing device;

generating second network address information associated with the first computing device; and including the second network address information in a second Internet Protocol packet header of the second data.

19. The method of claim 12, further comprising:

receiving, from the second computing device, an indication that a web browser of the second computing device has been closed; and receiving the third data after receiving the indication.

20. The method of claim 12, wherein the first computing device communicates with the second computing device using a peer-to-peer communication channel selected from the group consisting of WiFi Direct, Bluetooth, Near Field Communication, IrDA, wireless Universal Serial Bus, Z-Wave, and ZigBee.

* * * * *